United States Patent [19]
Richerson et al.

[11] 3,836,374
[45] Sept. 17, 1974

[54] HOT PRESSED SILICON NITRIDE

[75] Inventors: David W. Richerson, Auburn; Malcolm E. Washburn, Princeton, both of Mass.

[73] Assignee: Norton Company, Worcester, Mass.

[22] Filed: Dec. 26, 1972

[21] Appl. No.: 318,474

Related U.S. Application Data

[63] Continuation-in-part of Ser. No. 219,369, Jan. 20, 1972, abandoned.

[52] U.S. Cl................................. 106/55, 106/73.5
[51] Int. Cl............................................ C04b 35/58
[58] Field of Search..................... 106/39.5, 55, 73.5

[56] References Cited
FOREIGN PATENTS OR APPLICATIONS
970,639   9/1964   Great Britain........................ 106/55
1,092,637  11/1967  Great Britain........................ 106/55

*Primary Examiner*—J. Poer
*Attorney, Agent, or Firm*—Oliver W. Hayes

[57] ABSTRACT

A hot pressed silicon nitride product is described, the product having high strength at room temperature as well as high strength at elevated temperature. The product has a flexural strength in excess of 100,000 psi at 20°C., in excess of 90,000 psi at 1,200°C., in excess of 35,000 psi at 1,375°C, and preferably above 45,000 psi at 1,375°C. A preferred form of the product includes between .25 and 2.0 mg in the form of complex silicate, which silicate also contains a limited amount of iron, aluminum and calcium. The complex silicate has a liquidus above 1,400°C. The product has a density between 3.1 and 3.3 g/cc, the total oxygen content of the product being less than 5%.

9 Claims, 1 Drawing Figure

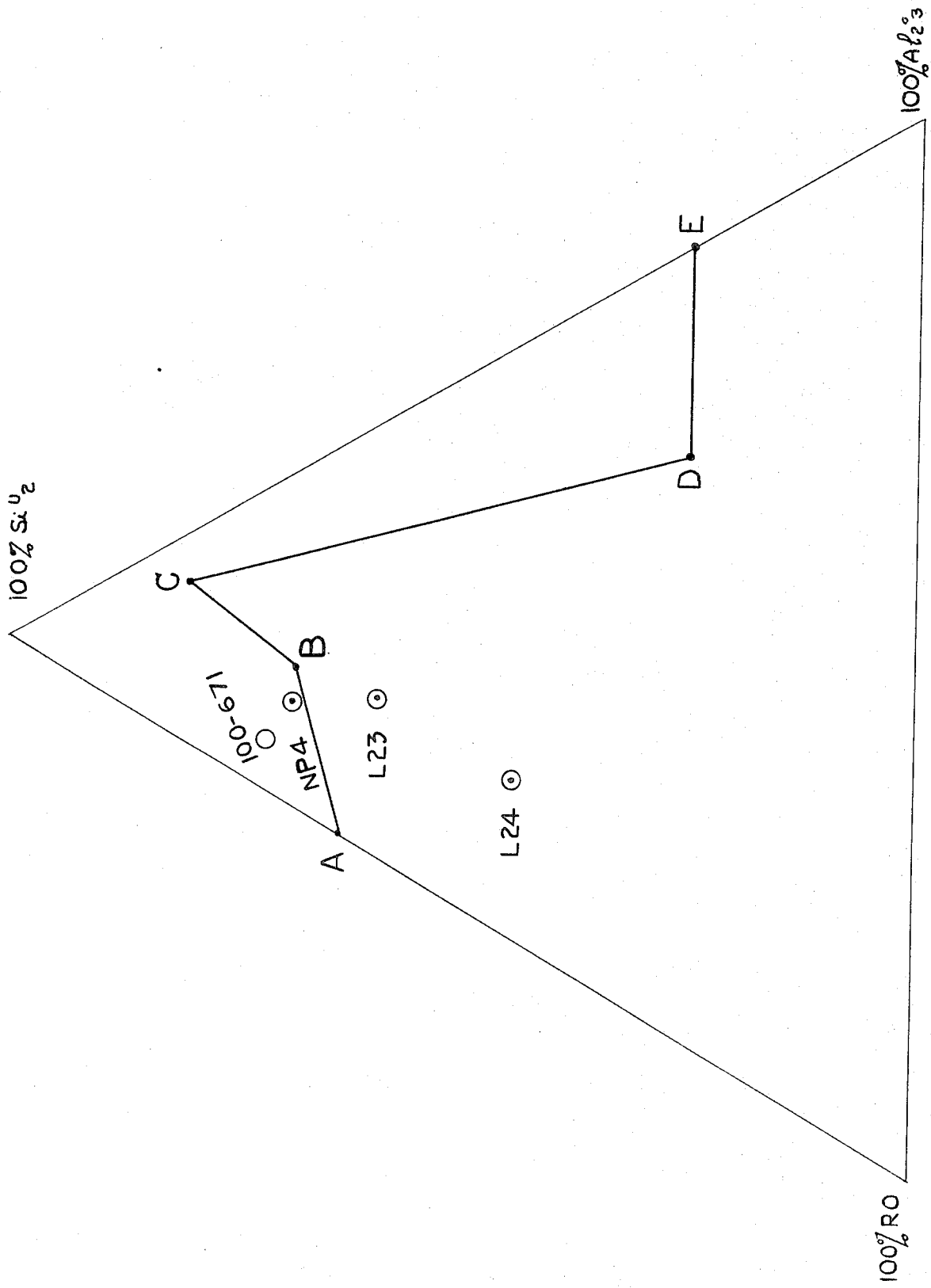

HOT PRESSED SILICON NITRIDE

This application is a continuation-in-part of an original application Ser. No. 219,369 filed on Jan. 20, 1972, now abandoned.

BACKGROUND OF THE INVENTION

The present invention is directed to high strength silicon nitride products having improved oxidation resistance and improved strength at elevated temperature. Hot pressed silicon nitride has been the subject of considerable work by a number of groups, both in the United States and in Great Britain. Much of the leading work has been done in the United Kingdom and is described in such papers as Lumby and Coe, Proceedings of the British Ceramic Society No. 15 January 1970, pp. 91–101; Progress Report of Professor Jack et al, Ministry of Defense, June 1970; Lloyd, Special Ceramics, 4 165–172 ed. P. Popper, Henry Blacklock and Co. Ltd., Manchester, Great Britain (1968); Deeley et al, Powder Metallurgy, 8 145–151 (1961); British Pat. Nos. 970,639 and 1,092,637 and U.S. Pat. No. 3,455,729. None of the products, described by these prior workers has all of the attributes of the present invention.

THE PRESENT INVENTION

For many applications of silicon nitride which are currently in the development stage, it is extremely important that the product have high strength at room temperature and high strength (or rupture modulus) at elevated temperature. This is particularly true where it is to be used as a high temperature structural material (e.g. turbine blade), bearing or other wearing surface, for such applications as gas turbines, Wankel engines and the like.

Accordingly, a principal object of the present invention is to provide a product which satisfies these rigid requirements of high strength over an extremely wide range of temperatures from room temperature to 1,400° C. While the precise reasons for the superior performance of the product of the present invention are not completely understood, it is believed that they flow from the narrow limitations which have been specified for the physical and chemical properties of the present product.

Recent data indicates that $Si_3N_4$ powder hydrolyzes in the presence of water or water vapor at room temperature:

$$Si_3N_4 + 6H_2O \rightarrow 4NH_3 + 4SiO_2$$

This hydrolysis reaction appears to occur very rapidly on a fresh, clean $Si_3N_4$ surface. Such a clean particle surface is present immediately after the nitriding operation, or immediately upon rupture of a larger particle into smaller particles. This hydrolysis reaction forms a $SiO_2$ layer on the face of the $Si_3N_4$ particle which is estimated to be from one to five molecules thick. Thereafter, subsequent hydrolysis is much slower, being controlled by the necessity for diffusion of water vapor through the formed $SiO_2$ layer to the underlying $Si_3N_4$ and the outward diffusion of the by-product $NH_3$.

The presence of a $SiO_2$ layer on the $Si_3N_4$ particles is believed to have a strong effect upon the hot pressing of $Si_3N_4$ powder and upon the properties of the resulting hot pressed product. It has been postulated that magnesium oxide (or any other magnesium compound that yields MgO upon heating) added to the $Si_3N_4$ powder reacts with the silica layer to form a complex magnesium silicate during the hot pressing operation and that this complex silicate largely controls the intergranular bonding in the silicon nitride product. Assuming that this postulation is correct, an unusually thick layer of $SiO_2$ will result in an excess of the interstitial bond phase and significantly lower the strength of the final product at elevated temperatures since the product will partake of the physical characteristics of the interstitial phase rather than the silicon nitride itself. An unusually thin layer of $SiO_2$ can result in a deficiency of the interstitial phase resulting in inadequate bonding and poor hot pressability.

In the light of the above comments, it is desired that the product of the present invention be prepared from silicon nitride powder having a controlled silica layer at the surface of the particles and that a controlled quantity of magnesium oxide (or any other magnesium compound which yields MgO when heated) be added to allow the proper formation of a complex magnesium silicate bonding phase during the hot pressing operation. In the preferred method of practicing the invention, alpha silicon nitride powder with an average particle size of 1 to 3 microns, a surface-contained silica layer, and an oxygen content of 2 percent to 5 percent (by weight) is intimately mixed with .25 percent to 2.0 percent magnesium (in the form of MgO or of any magnesium compound which yields MgO during heating) and hot pressed. The resulting product consists predominantly of beta silicon nitride crystals averaging under 1 micron in size with a non-crystalline complex magnesium silicate concentrated at the grain boundaries and supposedly bonding the system together. In the preferred embodiment of the invention, the interstitial complex magnesium silicate has a composition with a liquidus above 1,400° C. In addition to the above limitations on the product, the presence and proportions of other metallic impurities is extremely critical. In any commercial $Si_3N_4$, there will be some iron, aluminum, calcium and magnesium. Table I summarizes a controlled experiment to determine the relative effects of Fe, Al, and Ca for a constant Mg content.

TABLE I

Effect of Individual Impurities on the Strength of Silicon Nitride

| Sample No. | Major Mg | Impurities (Weight Percent) Ca | Fe | Al | Room Temperature Flexure Strength | 1375° Flexure Strength |
|---|---|---|---|---|---|---|
| 1 | 0.46 | 0.06 | 0.34 | 0.15 | 125,900 psi | 65,600 psi |
| 2 | 0.44 | 0.06 | 0.68 | 0.11 | 110,900 | 49,100 |
| 3 | 0.46 | 0.05 | 0.32 | 0.62 | 131,800 | 48,200 |
| 4 | 0.44 | 0.06 | 0.78 | 0.54 | 133,900 | 43,000 |
| 5 | 0.46 | 0.30 | 0.24 | 0.11 | 132,900 | 42,800 |
| 6 | 0.44 | 0.28 | 0.78 | 0.11 | 128,800 | 41,000 |
| 7 | 0.40 | 0.26 | 0.24 | 0.64 | 145,800 | 40,700 |
| 8 | 0.40 | 0.44 | 0.26 | 0.10 | 135,000 | 29,000 |

The data for Table I were generated the following way. A uniform batch of silicon nitride powder, known to produce samples with the superior properties of the material described in this application, was used to hot press a control sample (No. 1) and as a base to which to add controlled amounts of Ca, Al, and Fe in such quantities as to approximate the composition of typical prior art silicon nitride. The chemical composition of the samples was determined by emission spectrographic analysis. Test bars were machined and tested to determine room temperature strength and 1,375° strength.

Additions of Ca, Fe, and Al all caused the high temperature strength to decrease. Ca was added in the least quantity, but had the greatest effect.

The individual strength values in Table I should not be compared with other strength values listed in this application. The important comparisons are those with each table, since all the samples listed within a given table were processed equivalently and tested at one time under relatively constant conditions.

Based upon the data in Table I and general observations on a variety of samples, iron or aluminum can vary considerably without extreme effects on high temperature strength, as long as both are not high at the same time. This is not true for calcium. Very small increases in the calcium content above 0.1 percent result in impairment of the high temperature properties. Even a content as low as 0.05 percent Ca has been shown to result in deterioration of properties at temperatures above 1,300° C. For instance, a sample containing 0.05 percent Ca was oxidized at 1,400° C for 50 hours resulting in a thin whitish layer at the surface of the sample. This was analyzed by X-ray diffraction and emission spectroscopy and found to consist of cristobalite plus enstatite and contained 0.5 percent Ca. Since the Ca level was roughly 10 times as concentrated in the oxidation layer as in the sample, one would suspect that the high mobility of the Ca is contributing to the oxidation and probably to the deterioration of other high temperature properties.

The above discussions indicate that Ca content must be as low as possible (preferably completely absent) and that Fe and Al, although not as critical as Ca, should be held within reasonable limits. The following levels have been achieved and produced properties consistent with the intent of this invention: Ca 0.05, Al 0.11, Fe 0.26. Reasonable upper limits are: Ca 0.12, Al 0.75, Fe 0.75.

The reduction in high temperature strength is thought to be due to modification of the grain boundary magnesium silicate phase by impurities. Each impurity that enters this phase will modify its viscosity, refractoriness and other properties, resulting in a decrease in the liquidus. Since testing and intended applications are at 1,375° C, it is very important that the liquidus is not below 1,400° C.

The amount of silicate phase and the composition of the silicate phase must be controlled to achieve the product of the invention. A guide to the range of composition for the silicate phase is the $MgO \cdot Al_2O_3 \cdot SiO_2$ phase equilibrium diagram ("Phase Diagrams for Ceramists," American Ceramic Society, 1964, FIG. 712), which shows compositions of the liquidus isotherms for this system. These liquidus temperatures are reduced by additions of oxides such as CaO, FeO, and MnO.

There are several other general statements that can be made concerning the compositional limits of the complex silicate included in the $Si_3N_4$ of the present invention. The first is that the MgO/CaO ratio be greater than four since in the $MgO \cdot CaO \cdot SiO_2$ system all compositions with this radius have a liquidus above 1,500° C.

Because of interactions of all of the oxide components in the silicate phase, in order to obtain a silicate phase with a liquidus above 1,400° C., the composition of this phase should have compositions on the high silica side of line ABCDE on the $RO \cdot Al_2O_3 \cdot SiO_2$ ternary composition diagram, with the points A, B, C, D, and E as shown in Table I. RO is the aggregate percent of metal oxides from the group consisting of MgO, CaO, FeO, and MnO.

TABLE II

| Point | Composition % | | |
|---|---|---|---|
| | RO | $Al_2O_3$ | $SiO_2$ |
| A | 37 | 0 | 63 |
| B | 19 | 13 | 68 |
| C | 4 | 15 | 81 |
| D | 20 | 55 | 25 |
| E | 0 | 75 | 25 |

Similarly, it is important that the product have a density between 3.1 and 3.3 g/cc. to guarantee maximum strength, corrosion resistance, wear resistance, oxidation resistance and other properties at both room temperature and high temperature.

Strength tests have shown that the Mg content can be varied from 0.4 to 1.75 percent without causing a significant change in high temperature strength. The results are summarized in Table III.

TABLE III

| Sample No. | %Mg | Flexure Strength at 1375°C |
|---|---|---|
| NP-43 | 0.44 | 36,600 |
| NP-39 | 0.6 | 38,500 |
| NP-40 | 0.88 | 48,900 |
| NP-41 | 1.30 | 43,000 |
| NP-42 | 1.74 | 44,400 |

These samples were prepared under un-optimized processing conditions. More recent work shows that good strengths can be obtained even with as little as 0.4 percent Mg (added in the form of $MgCO_3$).

The reason additional Mg does not cause a reduction in high temperature strength is thought to be due to the ratio effect of Mg to Ca and Fe. Excess Mg only increases the ratio in a direction that should improve refractoriness of the grain boundary phase. However, as the grain boundary phase gets thicker, the high temperature strength should decrease again. The time dependent properties will be affected even sooner. Stress rupture and creep was not measured on the samples in Table III, but it is very possible that these time dependent properties would be affected by the excess Mg. Therefore, for this invention, it is still preferred that Mg be on the lower side.

Most of the silicon nitride of the present invention has been processed in such a way that tungsten has been picked up as an impurity. Tungsten quantities (determined by emission spectroscopy using tungsten carbide in silicon carbide as a standard) have been measured from 0.06 percent to around 5 percent with no significant decrease in strength. To evaluate this on a more controlled basis, a control sample of powder was prepared. Part of this powder was hot pressed directly to produce sample NP-46. Another portion was acid treated with $HNO_3$ to oxidize the WC and then treated with $NH_4OH$ to remove the tungsten oxide compound. Sample NP-47 was hot pressed from this "cleaned" powder. Table IV shows the results.

TABLE IV

| Sample No. | Effect of Tungsten on High Temperature Strength | | | | | |
|---|---|---|---|---|---|---|
| | Mg | Al | Ca | Fe | WC | Strength at 1375°C |
| NP-46 | 0.58 | 0.16 | 0.06 | 0.28 | 2.2 | 55,100 psi |
| NP-47 | 0.58 | 0.18 | 0.04 | 0.34 | 0.06 | 52,100 psi |

The tungsten is present in the $Si_3N_4$ as sub-micron particles of a tungsten-silicon or a tungsten-iron-silicon phase. The effect on all the properties is not known, nor is the total permissable percentage, but presently the effects do not seem critical.

Set forth below is one preferred method of practicing the present invention:

EXAMPLE I

Two lots of powder were prepared and hot-pressed generally as described in British Pat. No. 1,092,637. These are designated as L23 and L24. Two lots of powder were also prepared by the process of the above patent but their chemical composition was controlled in synthesis, milling, and hot pressing to regulate the total oxide content and the proportions of oxides in the silicate phase. These are designated 100671 and NP4. Typical analyses of these products are set forth in Table V below.

In Table VI, we have assumed that the oxides are in the interstitial silicate phase and have calculated the percent of each oxide in the silicate phase. Because the $TiO_2$ is so low, it has been included with the $SiO_2$. In Table VII, the MgO/CaO and MgO/FeO ratios are shown. Table VIII lists the density and flexural strength of the products.

TABLE V

| | Level of Major Impurities | | | | | | | |
|---|---|---|---|---|---|---|---|---|
| | Product Made According to British Patent 1,092,637 | | | | Product Made According to Present Invention | | | |
| | Wt. % | | | | Wt. % | | | |
| Element or Compound | Sample L23 | | Sample L24 | | Sample 100671 | | Sample NP4 | |
| | Element | Oxide | Element | Oxide | Element | Oxide | Element | Oxide |
| Al | .62 | 1.17 | .36 | .68 | .18 | .34 | .46 | .87 |
| Fe | .50 | .65 | .36 | .47 | .30 | .39 | .28 | .36 |
| Ca | .26 | .36 | .34 | .47 | .08 | .11 | .07 | .10 |
| Mg | .56 | .94 | .52 | .87 | .60 | 1.01 | .82 | 1.37 |
| Mn | .07 | .09 | .07 | .09 | .10 | .13 | .10 | .13 |
| Ti | .06 | .10 | 0.2 | .03 | .04 | .07 | .04 | .07 |
| Total | 2.07 | 3.31 | 1.67 | 2.61 | 1.30 | 2.05 | 1.77 | 2.90 |
| Total $O_2$ | 3.68 | | 2.02 | | 3.34 | | 4.38 | |
| $O_2$ Available for $SiO_2$* | 2.44 | | 1.08 | | 2.59 | | 3.25 | |
| $SiO_2$ | | 4.58 | | 2.03 | | 4.86 | | 6.09 |
| Total Oxides | | 7.89 | | 4.64 | | 6.91 | | 8.99 |

*Calculated

Table VI

| | Composition of Interstitial Phase | | | |
|---|---|---|---|---|
| | Product Made According to British Patent 1,092,637 | | Product Made According to Present Invention | |
| Oxide Component | Wt. % | | Wt. % | |
| | Sample L23 | Sample L24 | Sample 100671 | Sample NP4 |
| $SiO_2$ | 59.3 | 44.4 | 71.3 | 68.5 |
| $Al_2O_3$ | 14.8 | 14.7 | 4.9 | 9.7 |
| MgO | 11.9 | 18.7 | 14.6 | 15.2 |
| CaO | 4.6 | 10.1 | 1.6 | 1.1 |
| FeO | 8.2 | 10.1 | 5.6 | 4.0 |
| MnO | 1.1 | 1.9 | 1.9 | 1.4 |

Table VII

| | Oxide Ratios in Interstitial Phase | | | |
|---|---|---|---|---|
| | Product Made According to British Patent 1,092,637 | | Product Made According to Present Invention | |
| Ratio | Sample L23 | Sample L24 | Sample 100671 | Sample NP4 |
| MgO/CaO | 2.6 | 1.9 | 9.2 | 13.7 |
| MgO/FeO | 1.4 | 1.9 | 2.6 | 3.8 |

Table VIII

| Flexure Strength | Flexure Strength and Density | | | |
|---|---|---|---|---|
| | Product Made According to British Patent 1,092,637 | | Product Made According to Present Invention | |
| | Sample L23 | Sample L24 | Sample 100671 | Sample NP4 |
| At 20°C. | 142,800 psi | 122,800 psi | 130,300 psi | 145,800 |
| At 1200°C. | 45,400 do. | 60,800 do. | 100,000 do. | 100,600 |
| At 1375°C. | 20,600 do. | 25,500 do. | 45,200 do. | 44,800 |
| Bulk Density | | | | |
| At 20°C. | 3.22 g/cc | 3.18 g/cc | 3.19 g/cc | 3.16 g/cc |

TABLE IX

Liquidus Temperatures* of $RO \cdot Al_2O_3 \cdot SiO_2$ Phase From Equilibrium Diagrams

| System | Product Made According to British Patent 1,092,637 | | Product Made According to Present Invention | |
|---|---|---|---|---|
| | Sample L23 | Sample L24 | Sample 100671 | Sample NP4 |
| $MgO \cdot Al_2O_3 \cdot SiO_2$ | 1420°C. | 1650°C. | 1660°C. | 1560°C. |
| $CaO \cdot Al_2O_3 \cdot SiO_2$ | 1250 | 1250 | 1480 | 1425 |
| $FeO \cdot Al_2O_3 \cdot SiO_2$ | 1440 | 1200 | 1590 | 1530 |

*For each sample, the total divalent metal oxides were combined as the RO component and this composition plotted on the respective equilibrium diagram.

The data in the tables show the effect of the composition of the silicate phase upon the high temperature strength of hot pressed $Si_3N_4$. For the four samples, it can be seen that in this range, the total percentage of oxide phases is not as important as the chemistry of the phases. (Of course, too high a percentage of oxide phases would lower the strength due to an excess of interstitial phase.) L24 has lower total oxide content than 100671, but is considerably weaker at high temperature. However, the total percent of non-silica oxides with respect to total silica content is much higher for both L23 and L24 than for 100671 and NP4.

The drawing is a ternary composition diagram which shows all compositions in the system $RO \cdot Al_2O_3 \cdot SiO_2$ where RO represents the sum of all divalent metal oxides. Line ABCD corresponds closely to the 1,500° C. liquidus isotherm in the $MgO \cdot Al_2O_3 \cdot SiO_2$ system. Line DE is determined by compositional restrictions resulting from the MgO addition. Any composition higher in silica than line ABCDE in the $MgO \cdot Al_2O_3 \cdot SiO_2$ system has a liquidus above 1,500° C. If a part of the MgO is replaced by other alkaline earth oxides, the liquidus temperature will generally decrease somewhat.

We have attempted to estimate this effect from known phase equilibrium data in 2, 3, and 4 component systems, and have selected the 1,500° C. liquidus isotherms of the $MgO \cdot Al_2O_3 \cdot SiO_2$ system as being representative of the 1,400° C. liquidus isotherms in the multicomponent $RO \cdot Al_2O_3 \cdot SiO_2$ system where RO is made up of the divalent metal oxides such as MgO, CaO, FeO, MnO, etc. (with MgO in largest amounts). The logic of this assumption can be seen in Table IX, where the RO is combined, the liquidus temperature can be ascertained from the respective phase equilibrium diagrams of MgO, CaO, or FeO (MnO liquidus isotherms not available but similar to FeO). Thus, the actual liquidus temperatures of L23 and L24 are below 1,400° C. and the liquidus temperatures of 100671 and NP4 are above 1,400° C.

EXAMPLE II

In a preferred form of the invention the silicon nitride is prepared as follows:

The starting silicon powder was obtained with nominal specifications of .5 Fe, .1 Al and .05 Ca. Typical analysis .35 Fe, .15 Al and .06 Ca. The silicon was nitrided to produce silicon nitride powder with a nominal $\alpha$ $Si_3N_4$ content of 90 percent, the rest being primarily $\beta$ $Si_3N_4$ plus minor $Si_2ON_2$ and traces SiC and Si. From batch to batch, $\alpha$ $Si_3N_4$ content has varied from 86 percent to 94 percent. Silicon nitride was then put through jaw crusher and roll crusher and finally through Alpine hammer mill. Powder is now minus 100 mesh.

In a preferred embodiment 3 percent $MgCO_3$ is then added to the $Si_3N_4$ powder and approximately 4,000 grams placed in a tungsten carbide lined ball mill of internal dimension 11 inches ID by 11 inches high. Milling media are 1/2 inch diameter, tungsten carbide spheres filling roughly 2/5 of the volume of the mill. Milling fluid is isopropyl alcohol, 4,500 ml. per 4,000 grams powder.

The powder was milled 12 hours at 54 rpm. The slurry was then emptied into a stainless steel tray and allowed to dry. The dried powder was broken up and screened through a 40 mesh screen and was ready for hot-pressing.

Hot-pressing was done at 1,730° C. and 2,500 psi, holding at pressure and temperature for 90 minutes.

A typical 6¼ inches × 6¼ ¼inches × 1¼ inches silicon nitride billet made according to the above instructions had the following properties:

| Room Temp. | MOR | 147,700 psi |
| 1375°C | MOR | 56,200 psi |

Ca .05, Fe .42, Al .18, Mg .42, WC 1.4

EXAMPLE III

The following example points out the uniqueness and great improvement over prior art $Si_3N_4$ in high temperature time dependent properties:

TABLE X

Stress Rupture of Hot Pressed $Si_3N_4$

Low Purity Material Typical of Prior Art (Similar to Sample No. L23 e.g. .76% Al, .48% Fe, .26% Ca and .66% Mg)

(Room Temperature Flexure Strength Above 140,000 psi)

| Test No. | Temp. | Stress psi | Deformation | Time to Fracture |
|---|---|---|---|---|
| 1 | 1200°C | 40,000 | — | Broke during loading |
| 2 | do. | 30,000 | — | do. |
| 3 | do. | 20,000 | — | 1/6 hr. |
| 4 | do. | 20,000 | — | 1 hr. |
| 5* | do. | 15,000 | .014 inch | 108 hrs. |

Higher Purity Material Typical of Present Invention (Sample No. SN 100671)

| Test No. | Temp. | Stress psi | Deformation | Time to Fracture |
|---|---|---|---|---|
| 1 | 1200°C | 50,000 | <.001 | 0.1 hr. |
| 2 | do. | 50,000 | .002 | 2.6 hrs. |
| 3 | do. | 40,000 | .010 | 93.0 hrs. |
| 4 | do. | 45,000 | .002 | 5.7 hrs. |
| 5 | do. | 35,000 | .0045 | 5.0 hrs. |
| 6 | do. | 35,000 | .008 | 16.2 hrs. |
| 7 | do. | 40,000 | .006 | 17.8 hrs. |
| 8 | do. | 45,000 | .010 | 40.0 hrs. |
| 9* | do. | 30,000 | | 250 hrs. |

*Test terminated with sample unbroken.

Table X illustrates that the time dependent properties of the silicon nitride of the present invention are superior by at least an order of magnitude to those of prior art silicon nitride. The great improvement again is thought to be due to the modification of the interstitial phase by careful control of impurities. The reduction in calcium in particular reduces the mobilities of components in the inter-granular bond phase resulting in greater refractoriness and less crack propogation due to grain boundary sliding and separation.

EXAMPLE IV

The same materials evaluated in Example III for stress rupture properties were tested for high temperature oxidation resistance in an oxygen atmosphere. The material of the present invention is much superior to prior art silicon nitride at high temperatures in an oxidizing atmosphere.

Oxidation of $Si_3N_4$ at high temperature produces a corroded surface which could result in fracture at lower-than-expected stress levels. To evaluate the effect of such Griffith-type flaws, strength bars were prepared from the two above materials. Half were oxidized at 1,400° C. in air for 70 hours and tested for modulus of rupture at room temperature. The other half were tested in the unoxidized condition.

| | |
|---|---|
| Prior art material | |
| Before Oxidation | 144,100 psi |
| After Oxidation | 55,500 psi |
| Improved purity material | |
| Before Oxidation | 130,000 psi |
| After Oxidation | 72,100 psi |

The improved purity material had considerably less strength deterioration than did the prior art material. To determine if the strength loss was due strictly to an increase in Griffith flaws at the surface due to oxidation, the oxidation layer was removed by machining to yield a surface comparable to the unoxidized samples. The strength of both materials returned respectively to above 140,000 psi and 130,000 psi, statistically indistinguishable from unoxidized samples.

Whenever the expression "percent" is used in the specification and claims, it is intended to mean weight percent. The "liquidus temperature" is the minimum temperature at which a system of a given composition becomes completely liquid. Below the liquidus temperature, a solid phase will be present.

What is claimed is:

1. A monolithic, high density silicon nitride product, whose silicon nitride is predominantly beta phase, the product having a density between 3.1 and 3.3 g/cc, the product being characterized by a flexural modulus in excess of 100,000 psi at 20° C., in excess of 90,000 psi at 1200° C., and in excess of 35,000 psi at 1,375° C., the silicon nitride containing a complex metal silicate, the silicate having the general formula $RO \cdot Al_2O_3 \cdot SiO_2$, wherein RO represents the aggregate amount of oxides of metals selected from the class consisting of iron, calcium, magnesium and manganese, the silicate having a liquidus above 1,400° C., the product having a total oxygen content of between 2 percent and 5 percent.

2. The product of claim 1 wherein the MgO/CaO ratio is greater than 4.

3. The product of claim 1 wherein the calcium content is less than 0.1 percent.

4. The product of claim 1 wherein the composition of the complex silicate falls above the line ABCDE in the high $SiO_2$ portion of the $RO \cdot SiO_2 \cdot Al_2O_3$ ternary composition diagram shown in the drawing wherein A, B, C, D, and E have the following compositions:

| | RO | $Al_2O_3$ | $SiO_2$ |
|---|---|---|---|
| Point A | 37 | 0 | 63 |
| Point B | 19 | 13 | 68 |
| Point C | 4 | 15 | 81 |
| Point D | 20 | 55 | 25 |
| Point E | 0 | 75 | 25 |

5. A monolithic, high density silicon nitride product, whose silicon nitride is predominantly beta phase, the product having a density between 3.1 and 3.3 g/cc, the product being characterized by a rupture modulus in excess of 90,000 psi at 1,200° C. and in excess of 45,000 psi at 1,375° C., the silicon nitride containing a complex metal silicate whose composition is such that its liquidus is above 1,400° C., the product having a total oxygen content of between 2 percent and 5 percent.

6. A bulk, high density silicon nitride product, whose silicon nitride is predominantly beta phase, the product having a density between 3.1 and 3.3 g/cc, the product being characterized by a rupture modulus in excess of 90,000 psi at 1,200° C. and in excess of 45,000 psi at 1,375° C., the silicon nitride containing between .25 percent and 2 percent of magnesium, in the form of magnesium silicate, with a minor amount of metallic impurities, including iron, calcium and aluminum, the amount of such metallic impurities being below the amount necessary to form any complex with the magnesium silicate having a liquidus less than 1,400° C., the product having a total oxygen content of between 2 percent and 5 percent.

7. A dense, bulk silicon nitride product, whose silicon nitride is predominantly beta phase, the product being characterized by a rupture modulus in excess of 90,000 psi at 1,200° C. and in excess of 45,000 psi at 1,375° C., the silicon nitride containing between .3 percent and .9 percent of magnesium with a minor amount of other metals, including iron, calcium and aluminum, the metallic content being in the form of a complex silicate, the iron content being less than .30 percent, the calcium being less than .1 percent and the aluminum being less than .5 percent, the product having a density between 3.1 and 3.2 g/cc, the product having a total oxygen content of between 2 percent and 5 percent.

8. The product of claim 1 having a room temperature modulus of rupture of the product after exposure to air at 1,400°C for 70 hours is on the order of 70,000 psi and above.

9. The product of claim 1 which can resist rupture under a 45,000 psi load at 1,200° C for at least 1 hour.

* * * * *

UNITED STATES PATENT OFFICE
CERTIFICATE OF CORRECTION

Patent No. 3,836,374            Dated September 17, 1974

Inventor(s) David W. Richerson and Malcolm E. Washburn

It is certified that error appears in the above-identified patent and that said Letters Patent are hereby corrected as shown below:

TABLE V, under Sample Element: "0.2" should read - .02 -

Column 8, line 57, "6-1/4 1/4" should read - 6-1/4 -

Signed and sealed this 7th day of January 1975.

(SEAL)
Attest:

McCOY M. GIBSON JR.         C. MARSHALL DANN
Attesting Officer           Commissioner of Patents